(12) United States Patent
Tanaka et al.

(10) Patent No.: US 10,244,216 B2
(45) Date of Patent: Mar. 26, 2019

(54) PROJECTOR, VIDEO DISPLAY DEVICE, AND VIDEO DISPLAY METHOD

(71) Applicant: MAXELL, LTD., Kyoto (JP)

(72) Inventors: Kazuhiko Tanaka, Tokyo (JP); Mitsuo Nakajima, Tokyo (JP); Haruhiko Higuchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/771,318

(22) PCT Filed: Oct. 27, 2015

(86) PCT No.: PCT/JP2015/080164
§ 371 (c)(1),
(2) Date: Apr. 26, 2018

(87) PCT Pub. No.: WO2017/072842
PCT Pub. Date: May 4, 2017

(65) Prior Publication Data
US 2018/0309968 A1    Oct. 25, 2018

(51) Int. Cl.
*G09G 3/20* (2006.01)
*G09G 3/34* (2006.01)
(Continued)

(52) U.S. Cl.
CPC ........... *H04N 9/3185* (2013.01); *G03B 21/00* (2013.01); *G06T 7/521* (2017.01); *G09G 3/20* (2013.01);
(Continued)

(58) Field of Classification Search
CPC .... H04N 9/3185; H04N 9/3114; G06T 7/521; G06T 2207/10016; G06T 2207/10024
See application file for complete search history.

(56) References Cited

U.S. PATENT DOCUMENTS

| 6,222,593 B1 | 4/2001 | Higurashi et al. |
| 2005/0117126 A1 | 6/2005 | Miyazawa et al. |

(Continued)

FOREIGN PATENT DOCUMENTS

| JP | 2000-350230 A | 12/2000 |
| JP | 2002-318564 A | 10/2002 |

(Continued)

OTHER PUBLICATIONS

International Search Report for WO 2017/072842 A1 dated Jan. 26, 2016.

*Primary Examiner* — Michael E Teitelbaum
(74) *Attorney, Agent, or Firm* — Volpe and Koenig, P.C.

(57) ABSTRACT

When projecting a video in conformity to the shape of a three-dimensional object using a projector, a pattern such as a grid is projected and the projected pattern is photographed, and then the position or shape of a projection object is calculated, whereby making it possible to apply appropriate geometric transformation to a projected video. However, when a grid is projected in superposition while video content is being displayed, the grid is visible to a viewer, and that the position or shape of a projection video cannot be calculated while a video content is being displayed. The present invention uses the freedom of color representation and the color redundancy of a color wheel, buries an invisible pattern not visible to human eyes in a video, and photographs the video in synchronism with the rotation of the color wheel, thereby making it possible to discriminate the buried invisible pattern.

12 Claims, 9 Drawing Sheets

(51) Int. Cl.
*G09G 5/00* (2006.01)
*H04N 9/31* (2006.01)
*G03B 21/00* (2006.01)
*G06T 7/521* (2017.01)

(52) U.S. Cl.
CPC ............ *G09G 3/34* (2013.01); *G09G 5/00* (2013.01); *H04N 9/3114* (2013.01); *H04N 9/3194* (2013.01); *G06T 2207/10016* (2013.01); *G06T 2207/10024* (2013.01)

(56) References Cited

U.S. PATENT DOCUMENTS

| | | |
|---|---|---|
| 2010/0201894 A1 | 8/2010 | Nakayama et al. |
| 2013/0330088 A1 | 12/2013 | Oshima et al. |
| 2014/0085336 A1 | 3/2014 | Yamamoto et al. |
| 2014/0184914 A1* | 7/2014 | Oshima .............. H04N 5/445 348/564 |
| 2015/0029465 A1 | 1/2015 | Ishikawa et al. |

FOREIGN PATENT DOCUMENTS

| | | |
|---|---|---|
| JP | 2004-032665 A | 1/2004 |
| JP | 2005-37771 A | 2/2005 |
| JP | 2006-284718 A | 10/2006 |
| JP | 2007-166466 A | 6/2007 |
| JP | 2007-199351 A | 8/2007 |
| JP | 2015-026992 A | 2/2015 |
| JP | 2015-156663 A | 8/2015 |
| WO | 2005/055598 A1 | 6/2005 |
| WO | 2009/142015 A1 | 11/2009 |
| WO | 2012/120853 A1 | 9/2012 |

* cited by examiner

PROJECTOR, VIDEO DISPLAY DEVICE, AND VIDEO DISPLAY METHOD

TECHNICAL FIELD

The present invention relates to a projector, a video display device, and a video display method, and more particularly, to superimposition of an invisible pattern on a projection video for shape recognition of a projection object or the like.

BACKGROUND ART

In recent years, a technique called projection mapping, in which a video is projected onto an object placed in the real world using a video display device such as projector, has attracted public attention.

By using this technology, it is possible to project a video onto a screen which is placed at an angle without directly facing the projector, an uneven object, or the like in addition to a flat screen directly facing the projector. In a case in which a projection target such as screen does not face the projector directly, that is, in a case in which an optical axis of the projector and a projection target surface do not intersect at a right angle, geometric distortion occurs in a projected video. For example, in a case in which a screen is installed such that an upper side of the screen is close to the projector, and a lower side of the screen is far from the projector, if a square video is projected from the projector, so-called trapezoidal distortion in which the upper side of the square is projected shorter than the lower side occurs. In practice, since a similar phenomenon occurs not only in a vertical direction but also in a left and right direction, the square video projected from the projector is projected as a distorted rectangle having no parallel sides.

In this case, reverse geometric correction is applied to a video to be projected to cancel the distortion, and it is possible to correctly display the video in the square shape. The geometric correction (geometric transform) is called perspective transformation or projection transformation and can be implemented through a matrix calculation.

In order to calculate the matrix, it is necessary to acquire information related to a shape and a position of a projection object through a certain means.

A method for implementing this is disclosed in JP 2005-37771 A (Patent Document 1). In Patent Document 1, a shape of a projection target is acquired by projecting a grid using infrared light from a projector and performing photographing through an infrared camera.

CITATION LIST

Patent Document

Patent Document 1: JP 2005-37771 A

SUMMARY OF THE INVENTION

Problems to be Solved by the Invention

In Patent Document 1, in the projector using a single plate type micro mirror array as an optical modulator element, projection of an invisible pattern such as a grid is implemented by setting a region which only infrared light passes in a color wheel. However, since it is necessary to mount a special color wheel in order to implement the invention, it is disadvantageous in terms of cost, and even in a case in which pattern projection is not performed, the infrared light region on the color wheel is a period which is unable to be used for video display, and thus there is a problem in that it becomes a factor of degrading luminance of the projection video.

Solutions to Problems

In order to solve the above problem, as an example, the present invention provides a projector that divides an input video into videos of a plurality of color components, projects the videos of the respective color components to the same position of a projection object in a time division manner, optically synthesizes the videos of the plurality of color components, and performs color display of the input video on a surface of the projection object, including a light source, a color wheel that transmits only lights of wavelengths corresponding to the respective color components of light from the light source in the time division manner, an optical modulation device that modulates the light of the light source passing through the color wheel on the basis of a supplied color component video, a lens that projects the light modulated by the optical modulation device onto the projection object, and a projection video generation circuit that divides the input video into the videos of the plurality of color components and supplying the videos of the plurality of color components to the optical modulation device at a timing synchronized with an operation of the color wheel, in which the color component includes at least one of three components of R, G, and B which are three primary colors and a color component other than R, and B, and the projection video generation circuit causes a first superimposition video pattern to be superimposed on a video of the color component other than R, G, and B and causes a second superimposition video pattern to be superimposed on each of videos of the color components of R, G, and B, the second superimposition video pattern being generated to cancel the first superimposition video pattern on a surface of the projection object when averaged in a time direction.

Effects of the Invention

According to the present invention, it is possible to project and identify an invisible pattern using a general visible light camera using a color wheel of a projector using a micro mirror array without change.

MODE FOR CARRYING OUT THE INVENTION

Hereinafter, exemplary embodiments of the present invention will be described with reference to the appended drawings.

First Embodiment

Figure 1:
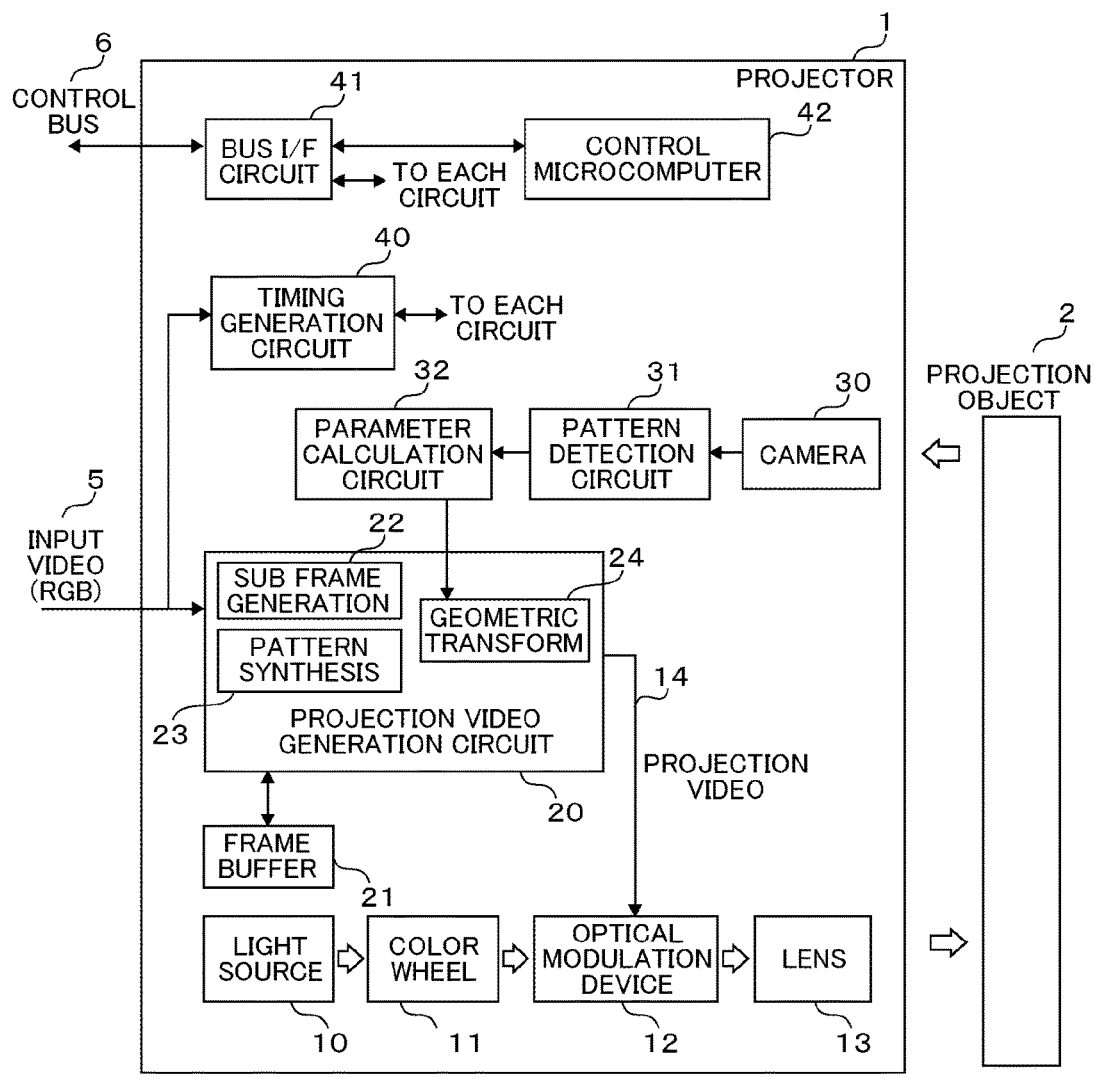
FIG. 1 is a configuration diagram of a video projection system in a first embodiment.

FIG. 1 is a diagram illustrating a configuration example of a video projection system in the present embodiment. In FIG. 1, denotes a projector, and the projector 1 performs video processing on an input video 5 and projects the resulting video onto a projection object 2. In the present embodiment, it is assumed that the projection object 2 is not only a normal flat screen but also a cube or a stereoscopic object such as a mannequin doll, and the projector 1 deforms the input video 5 to be suitable for the shape of the projection object 2 and then projects the resulting video onto the surface of the projection object 2.

Next, an internal configuration of the projector 1 will be described. In the present embodiment, a video projecting unit of the projector has a structure based on a projector using a single plate type micro mirror array, and unspecified parts have similar structures to those in the projector using the single plate type micro mirror array and performs similar operations to those in the projector using the single plate type micro mirror array. 10 denotes a light source, and light emitted from the light source 10 passes through a color wheel 11, is modulated in accordance with a projection video 14 by an optical modulation device 12, and projected onto the projection object 2 through a lens 13. The optical modulation device 12 has a structure in which micro mirrors are arranged in a two-dimensional plane, and each mirror has a structure in which a direction is changed in accordance with a value of each of pixels constituting the projection video 14, and light of an amount corresponding to each pixel value is projected onto the projection object 2.

In the present embodiment, the input video includes three primary colors of R, G, and B, but in the case of a projector of a single plate configuration in which a single optical modulation device 12 is mounted, a plurality of color components in a video are unable to be modulated at the same time. For this reason, color video projection is realized by performing processing for each color component in a time division manner. In other words, the color wheel 11 which rotates at high speed is arranged between the light source 10 and the optical modulation device 12, and color display is implemented by projecting videos of R, G, and B components onto the projection object 2 in a time-division manner.

Figure 2A:
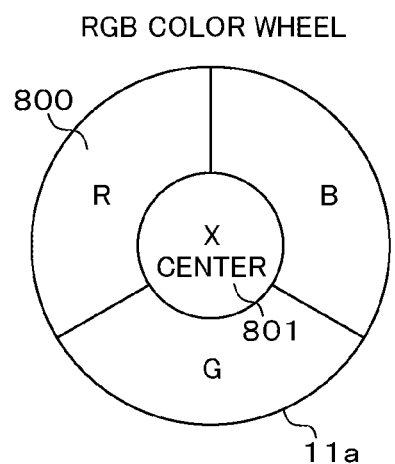
FIG. 2A is a configuration diagram of an RGB color wheel serving as a premise of the first embodiment.

First, a case in which an RGB color wheel 11a as illustrated in FIG. 2A is used as the color wheel 11 is considered. Here, a region 800 written as R a region that transmits only a light component of a wavelength corresponding to R and absorbs G and B. Similarly, regions written as G and B transmit only target light components. If the RGB color wheel is caused to rotate on a center 801 such that the RGB color wheel 1 performs a single rotation in one frame period of the input video 5, each of the R, G, and B components of the light irradiated from the light source 10 is radiated to the optical modulation device 12 by a ⅓ frame period.

Here, a sub frame generation circuit 22 in a projection video generation circuit 20 generates an R video which is a video in which only the R (red) component of the input video 5 is included, a G video in which only the G (green) component is included, and a B video in which only the B (blue) component is included. Since three video images of the R video, the G video, and the B video are obtained from the input video corresponding to one frame, the videos are referred to as sub frames. The sub frame generation circuit 22 has a function of shifting the sub frames temporally and outputting the sub frames in the time division manner using a frame buffer 21.

The projection video generation circuit 20 causes the R, G, and B sub frames generated from each frame of the input video 5 to be synchronized with the rotation of the color wheel 11 and drives the optical modulation device 12 in the time division manner. In other words, the optical modulation device 12 is driven with the video of the R sub frame when the color wheel 11 is R, driven with the video of the G sub frame when the color wheel 11 is G, and is driven with the video of the B sub frame when the color wheel 11 is B, and thus the R component, the G component, and the B component are projected onto the projection object 2 in the time division manner. Since human eyes have a property of integrating incoming videos in a time direction and recognizing the videos, if the sub frame is switched at a sufficiently fast speed, the R, G, and B videos projected in the time division are recognized as a color video.

Figure 2B:
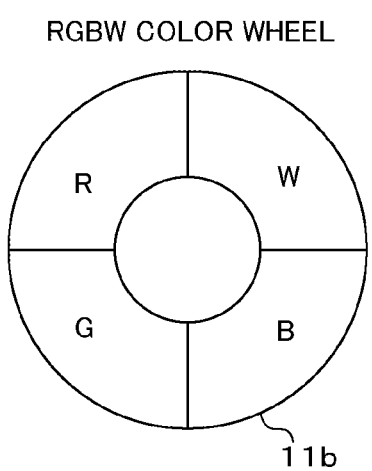
FIG. 2B is a configuration diagram of an RGBW color wheel in the first embodiment.

In the RGB color wheel, in a case in which the projection periods of the color components are equal, about ⅓ of the light generated by the light source 10 is used as the projection light onto the projection object 2, the remaining ⅔ is reflected or absorbed by the color wheel 11 and discarded. In order to reduce the discarded light and brighten projection luminance, there is a method using, for example, an RGBW color wheel 1ib illustrated in FIG. 2B. W indicates white light which is a region that transmits input light without change. If a case of projecting an all-white video is considered, only ⅓ of the light source light is used in a period in which the color wheel is R, G, and B, but the entire light source light can be used in a period in which the color wheel is W. As a result, in a case in which the RGBW color wheel is used, ½ (=⅓×¾1×¼) of the light source light can be used when the all-white video is projected.

In a case in which the RGBW color wheel is used, the projection video generation circuit 20 generates the projection video 14 including the R, G, B, and W components which are visible light from the input video 5 and outputs the projection video 14 in the time division manner.

On the other hand, since another color is added to the color wheel in addition to the three primary colors of R, G, and B, color redundancy in which a color expression method has a degree of freedom. For example, in a case in which the RGBW color wheel is used and the R, G, and B pixel values are equal, if an adjustment is performed so that the same color and luminance as W of the same pixel value are obtained, in order to project a white color, R, G, and B may be projected with the same pixel value, and the white may be turned, or R, G, and B may be turned off, and only white may be projected with the above-described pixel value.

In the present embodiment, an invisible pattern is superimposed on the video using the degrees of freedom and the color redundancy owned by the RGBW color wheel. Here, in order to simplify the description, a case in which the color wheel 11 is adjusted so that colors and luminances on the projection object 2 coincide with each other when R:G:B:W=1:1:1:0 and when R:G:B:W=0:0:0:1. In practice, even if this condition is not satisfied, it is possible to use the method of the present embodiment by adding a process of correcting the pixel value in advance.

In a case in which this color wheel is used, a relation between luminance values (Ri, Gi, Bi) of the respective components of R, G, and B at a point of a pixel position (xi, yi) on the screen and pixel values (Rp, Gp, Bp, Wp) of respective sub frames can be indicated by the following formulas.

$$Ri = Kr \times g(Rp) + Kwr \times g(Wp) \quad \text{(Formula 1a)}$$

$$Gi = Kg \times g(Gp) + Kwg \times g(Wp) \quad \text{(Formula 1b)}$$

$$Bi = Kb \times g(Bp) + Kwb \times g(Wp) \quad \text{(Formula 1c)}$$

Here, g( ) is a gamma function indicating a relation between the pixel value and the luminance and usually designed to be a power function. Kr, Kg, Kb, Kwr, Kwg, and Kwb are proportional constants. Here, a case in which the pixel value Wp of the white component is decreased by $\Delta W$ is considered. In this case, it is possible to uniquely decide a set of $\Delta R$, $\Delta G$, and $\Delta B$ satisfying the following formulas.

$$Ri = Kr \times g(Rp + \Delta R) + Kwr \times g(Wp - \Delta W) \quad \text{(Formula 2a)}$$

$$Gi = Kg \times g(Gp + \Delta G) + Kwg \times g(Wp - \Delta W) \quad \text{(Formula 2b)}$$

$$Bi = Kb \times g(Bp + \Delta B) + Kwb \times g(Wp - \Delta W) \quad \text{(Formula 2c)}$$

In a case in which the pixel values of the respective sub frames are (Rp, Gp, Bp, Wp) and in a case in which the pixel values of the respective sub frames are (Rp+$\Delta R$, Gp+$\Delta G$, Bp+$\Delta B$, Wp-$\Delta W$), it indicates that the luminance values of the R, G, and B components of the video on the projection object 2 obtained by performing time division projection on the respective sub frames are equal. In other words, $\Delta R + \Delta G + \Delta B = \Delta W$ and work to cancel one another. In the present embodiment, an invisible pattern is embedded in the projection video using this.

Figure 3:
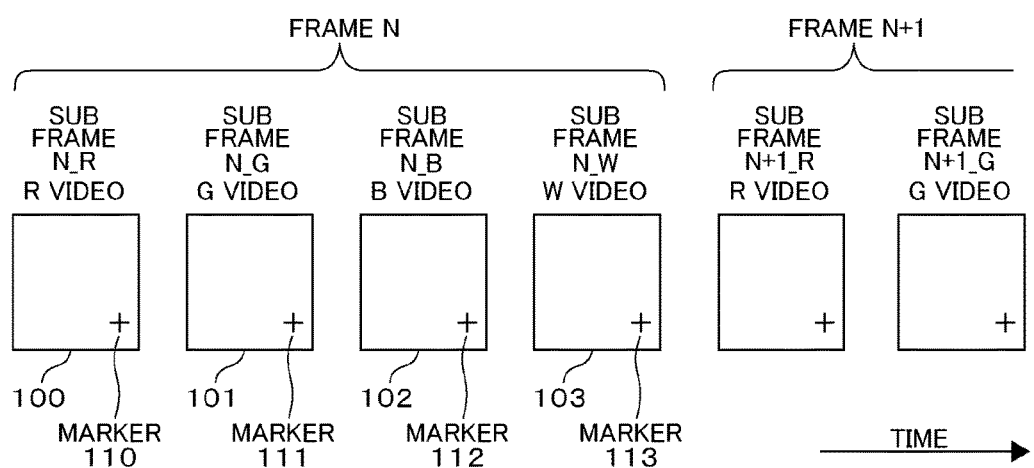
FIG. 3 is an example of a video sequence in which an invisible pattern is embedded in the first embodiment.
Figure 4:
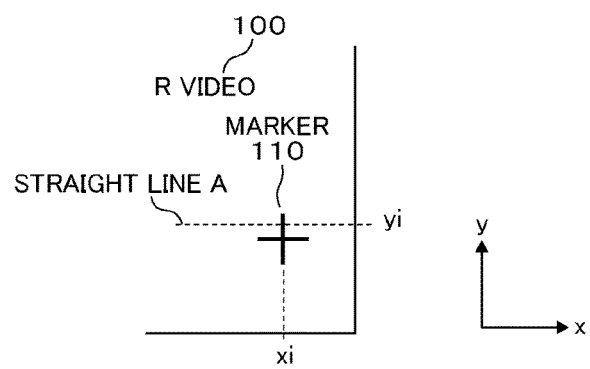
FIG. 4 is an enlarged view of a region around a marker in FIG. 3.

In the present embodiment, a case in which an invisible marker of a letter shape such as a cross shape is embedded at the same position of each sub frame. Coordinates of a point on the vertical line of the marker are indicated by (xi, vi). This aspect is illustrated in FIGS. 3 and 4. FIG. 3 is a diagram in which sub frame videos corresponding to the RGBW color wheel are chronologically arranged in a horizontal direction. A marker 110 is embedded in an R sub frame 100 of a frame N, a marker 111 is embedded in a G sub frame 101, a marker 112 is embedded in a B sub frame 102, and a marker 113 is embedded in a W sub frame 103. FIG. 4 illustrating an enlarged view of a region around the marker 110 in the R sub frame 100.

Figure 5:
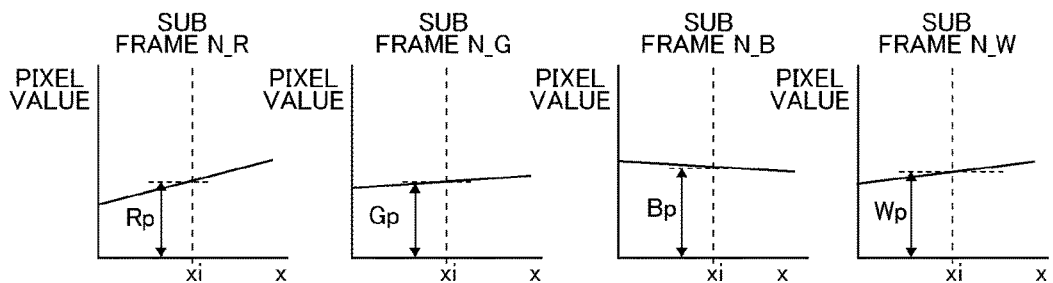
FIG. 5 is a diagram illustrating a luminance distribution before an invisible pattern is embedded in the first embodiment.
Figure 6:
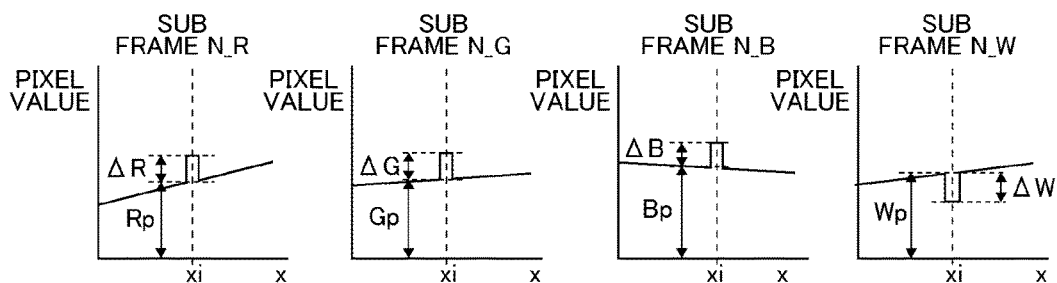
FIG. 6 is a diagram illustrating a luminance distribution after an invisible pattern is embedded in the first embodiment.

FIGS. 5 and 6 are graphs illustrating a relation between an x coordinate and a pixel value of a region around the marker, focusing on a pixel on a straight line A parallel to an X axis represented by y=yi. FIG. 5 is a graph illustrating a pixel value of the projection video before the marker is embedded, and FIG. 6 is a graph illustrating a pixel value of the projection video after the marker is embedded. The pixel values of the coordinates (xi, yi) are (Rp, Gp, Bp, Wp) in FIG. 5 and (Rp+$\Delta R$, Gp+$\Delta G$, Bp+$\Delta B$, Wp-$\Delta W$) in FIG. 6. The respective sub frame are projected in the time division manner, but if the cycle is sufficiently short, the sub frames are recognized as a video obtained by averaging the luminances of respective sub frames due to an integral effect of human eyes. In this case, $\Delta R + \Delta G + \Delta B$ and $\Delta W$ are canceled, and both the luminances before and after the marker is embedded are (Ri, Gi, Bi) and do not change depending on the presence or absence of the marker. In other words, the markers 110 to 113 embedded in the respective sub frames in FIG. 3 are invisible markers which are invisible to human eyes.

On the other hand, if the video projected onto the projection object 2 is captured through a camera 30 having a fast shutter speed, little integration effect occurs, and thus the video on which the marker is superimposed is captured.

In order to photograph the marker with a high degree of certainty, it is desirable to perform camera photographing in synchronization with the rotation of the color wheel 11. For example, if control is performed such that the camera photographing is constantly performed during the sub frame period of W, a marker having a relatively lower luminance than neighbor pixels is included in a captured video. The camera photographing may be performed in the sub frame period in all of R, G, and B.

In the captured video of the camera, since a marker video is obtained in a form in which it is superimposed on the input video 5, it is possible to detect marker coordinates using a technique such as pattern marching through a video analysis circuit which analyzes the captured video such as a pattern detection circuit 31 and a parameter calculation circuit 32 illustrated in FIG. 1. Further, in a case in which a pattern similar to the marker is included in the input video 5, it is possible to reduce a malfunction of pattern matching by changing a shape of a marker to be overlapped to a different object.

Depending on a pixel value before marker projection, there are cases in which the marker is unable to be superimposed. A countermeasure against this will be described in the third embodiment.

In the above example, the method of embedding the cross invisible marker has been described. The invisible pattern embedded in the present embodiment is not limited to this example, and any shape of pattern can be embedded. For example, a use example in a case in which a regular pattern such as a grid is embedded is described below.

Figure 7:
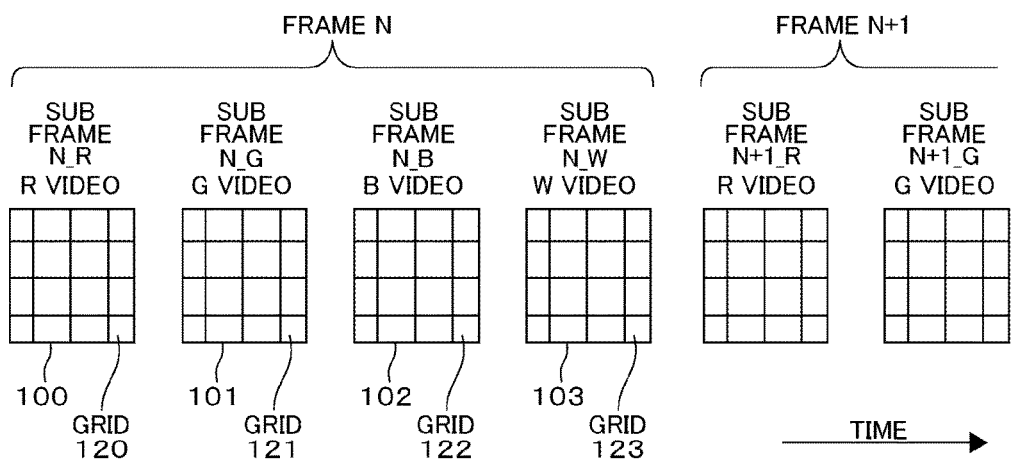
FIG. 7 is an example of a video sequence in which a grid pattern is embedded in the first embodiment.

FIG. 7 is a diagram in which sub frame videos corresponding to the RGBW color wheel are chronologically arranged in the horizontal direction. In FIG. 7, a grid pattern is superimposed on each sub frame using the same method as the cross marker described above. In other words, a grid 120 is embedded in an R sub frame 100 of a frame N, a grid 121 is embedded in a G sub frame 101, a grid 122 is embedded in a B sub frame 102, and a grid 123 is embedded in a W sub frame 103. Accordingly, it is possible to photograph the grid pattern while causing an unnecessary grid display not to be seen to a person watching a three-dimensional object of a measurement target as described above. Particularly, as a method for performing 3D measurement of a three-dimensional object, there is a method of projecting a grid pattern or a stripe pattern onto a measurement object through a projector and photographing it through a camera. Therefore, it is possible to perform 3D measurement while causing an unnecessary grid display not to be seen to a person watching a three-dimensional object of a measurement target through superimposition of the grid pattern illustrated in FIG. 7.

As described above, in the present embodiment, an invisible pattern invisible to human eyes is embedded in a video, and the video is captured in synchronization with the rotation of the color wheel using a camera, and thus it is possible to identify the embedded invisible pattern.

Specifically, a projector is a projector that divides an input video into videos of a plurality of color components, projects the videos of the respective color components to the same position of a projection object in a time division manner, optically synthesizes the videos of the plurality of color components, and performs color display of the input video on a surface of the projection object, including a light source, a color wheel that transmits only lights of wavelengths corresponding to the respective color components of light from the light source in the time division manner, an optical modulation device that modulates the light of the light source passing through the color wheel on the basis of a supplied color component video, a lens that projects the light modulated by the optical modulation device onto the projection object, and a projection video generation circuit that divides the input video into the videos of the plurality of color components and supplying the videos of the plurality of color components to the optical modulation device at a timing synchronized with an operation of the color wheel, wherein the color component includes at least one of three components of R, G, and B which are three primary colors and a color component other than R, G, and B, and the projection video generation circuit causes a first superimposition video pattern to be superimposed on a video of the color component other than R, G, and B and causes a second superimposition video pattern to be superimposed on each of videos of the color components of R, G, and B, the second superimposition video pattern being generated to cancel the first superimposition video pattern on a surface of the projection object when averaged in a time direction.

Further, a video display device is a video display device that displays a color video by dividing an input color video into color component videos of four or more colors and displaying the color component videos of four or more colors in a time division manner, including a video generation circuit that cause superimposition video patterns which cancel one another when a display video is averaged in a time direction for one frame cycle period to be superimposed on the color component videos of the four or more colors.

Further, a video display method is a video display method of displaying a color video by dividing an input color video into color component videos of four or more colors and displaying the color component videos of four or more colors in a time division manner, including causing patterns which cancel one another when the display videos are averaged in a time direction for one frame cycle period to be superimposed on the respective color component videos.

Accordingly, it is possible to project and identify the invisible pattern using a general visible light camera using the color wheel of the projector using the micro mirror array without change.

Second Embodiment

In the first embodiment, the example in which the RGBW color wheel is used has been described, but the present embodiment is not limited to thio example, and a point in which the present invention can be implemented using a color wheel having a combination of different colors if there are a degree of freedom and color redundancy among the color components of the respective sub frames.

Figure 8:
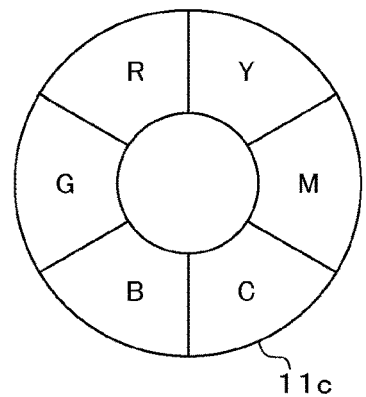
FIG. 8 is a color wheel configuration diagram of RGB-CMY in a second embodiment.

FIG. 8 illustrates an example of an RGBCMY color wheel used in the present embodiment. R is red, G is green, B is blue, and CMY are C (cyan), M (magenta), and Y (yellow) which are complementary colors. The complementary colors can be made by mixing R, G, and B. For example, it is possible to generate Y (Yellow) by mixing R (red) and G (green). Using this, it is possible to embed an invisible pattern, similarly to the first embodiment.

First, a relation between the pixel value and luminance of each sub frame before the marker is embedded is as follows.

$$Ri = Kr \times g(Rp) + Kcr \times g(Cp) + Kmr \times g(Mp) + Kyr \times g(Yp) \quad \text{(Formula 3a)}$$

$$Gi = Kg \times g(Gp) + Kcg \times g(Cp) + Kmr \times g(Mp) + Kyr \times g(Yp) \quad \text{(Formula 3b)}$$

$$Bi = Kb \times g(Bp) + Kcb \times g(Cp) + Kmr \times g(Mp) + Kyr \times g(Yp) \quad \text{(Formula 3c)}$$

Here, (Ri, Gi, Bi) are luminance values of the R, G, and B components at the point of the pixel position (xi, yi) on the projection object 2, (Rp, Gp, Bp, Cp, Mp, Yp) are pixel values before the marker is embedded, g( ) is a gamma function indicating a relation between the pixel value and the luminance, and Kr, Kg, Kb, Kcr, Kcg, Kcb, Kmr, Kmg, Kmb, Kyr, Kyg, and Kyb are proportional constants. A case of decreasing the pixel value of the Y component by $\Delta Y$ is considered. In this case, it is possible to uniquely decide a set of $\Delta R$, $\Delta G$, and $\Delta B$ satisfying the following formulas.

$$Ri = Kr \times g(Rp + \Delta R) + Kcr \times g(Cp) + Kmr \times g(Mp) + Kyr \times g(Yp - \Delta Y) \quad \text{(Formula 4a)}$$

$$Gi = Kg \times g(Gp + \Delta G) + Kcg \times g(Cp) + Kmr \times g(Mp) + Kyr \times g(Yp - \Delta Y) \quad \text{(Formula 4b)}$$

$$Bi = Kb \times g(Bp + \Delta B) + Kcb \times g(Cp) + Kmr \times g(Mp) + Kyr \times g(Yp - \Delta Y) \quad \text{(Formula 4c)}$$

Here, since B and Y are in a complementary color relation, Bi does not change even when the Y component is decreased by $\Delta Y$ as in Formula 4c.

Figure 9:
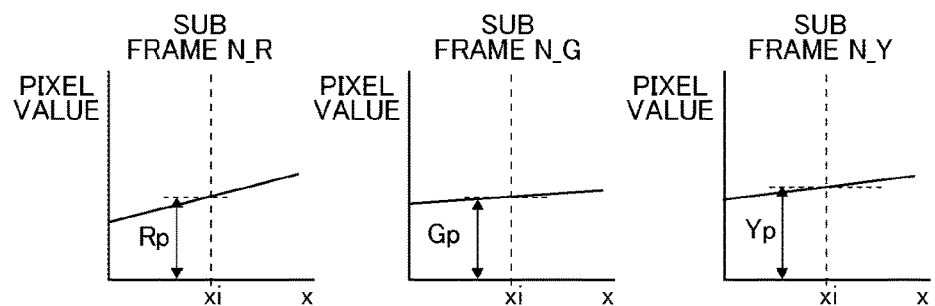
FIG. 9 is a diagram illustrating a luminance distribution before an invisible pattern is embedded in the second embodiment.
Figure 10:
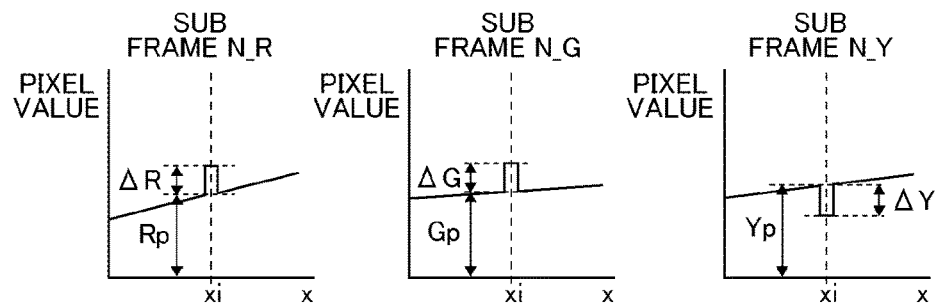
FIG. 10 is a diagram illustrating a luminance distribution after an invisible pattern is embedded in the second embodiment.

In other words, since $\Delta B$ is 0, the invisible marker can be embedded only in 3 sub frames of R, G, and Y. This aspect is illustrated in FIGS. 9 and 10. FIG. 9 is a graph illustrating a pixel value of the projection video before the marker is embedded, and FIG. 10 is a graph of a pixel value of the projection video after the marker is embedded. Since the B, C, and M components are not influenced by the embedding of the marker, the B, C, and M components are not illustrated.

The pixel values of the projection video 14 at the coordinates (xi, yi) is (Rp, Gp, Bp, Cp, Mp, Yp) in FIG. 9 and (Rp+$\Delta R$, Gp+$\Delta G$, Bp, Cp, Mp, Yp−$\Delta Y$) ($\Delta B$ is 0) in FIG. 10. The respective sub frame are projected in the time division manner, but if the cycle is sufficiently short, the sub frames are recognized as a video obtained by averaging the luminances of the respective sub frames due to an integral effect of human eyes. In other words, ΔR+ΔG and ΔY are canceled, and the marker embedded in each sub frame becomes an invisible marker invisible to human eyes.

On the other hand, if the projection video is captured through the camera having a fast shutter speed, little integration effect occurs, and thus the video on which the marker is superimposed is captured. In order to detect the marker with a high degree of certainty, it is desirable to perform camera photographing in synchronization with the rotation of the color wheel. For example, if control is performed such that the camera photographing is constantly performed during the sub frame period of Y, a marker video becomes a cross shape mark having a relatively lower luminance than neighbor pixels.

In the RGBCMY color wheel, it is possible to embed a pattern using the degrees of freedom and the color redundancy among G, B, and C and R, B, and M in addition to the degrees of freedom and the color redundancy among R, G, and Y. By using this, it is possible to independently three different embed pattern videos for one frame cycle period by performing the camera photographing using the respective periods of Y, C, and M of the color wheel. By using these three patterns, information of 3 bits per frame can be embedded at each pixel position, and thus a use method of allocating an ID to each marker using the information and identifying each marker is also possible.

Third Embodiment

The above embodiments have been described on the premise that the video in which the invisible pattern can be embedded at an arbitrary position in the video is input, but an actual video may have a region in which a pattern is unable to be embedded. This corresponds to a case in which the pixel value after marker embedding which is a parameter of the gamma function g( ) in Formulas 2a to 2c or Formulas 4a to 4c becomes overflow (that is, it becomes 2^N or more in a pixel expression of N bits per pixel) or underflows (it becomes a negative value).

Figure 11:
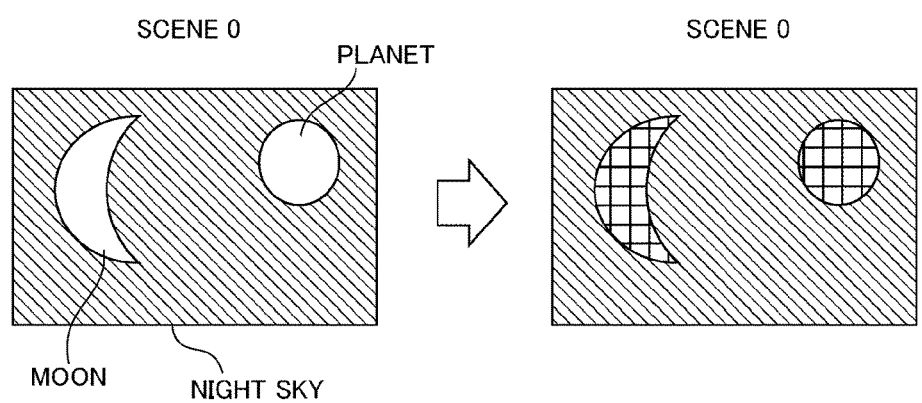
FIG. 11 is a grid pattern embedding example in a scene 0 in a third embodiment.

FIG. 11 illustrates an example thereof. FIG. 11 shows a scene in which a moon and a planet are shown in a night sky. As illustrated in the left drawing, in a case in which a night sky part is jet black, that is, the pixel values of all the components are 0, a pattern is unable to be embedded in the part. It is because for example, in a case in which the RGBW color wheel is used, if ΔW is subtracted from Wp for a pixel of (Rp, Gp, Bp, Wp)=(0, 0, 0, 0), Wp has a negative value. However, in this video, it is possible to embed an invisible pattern (a grid pattern in this case) in parts other than the night sky as illustrated in the right drawing of FIG. 11.

Here, in a case in which the pixel value of each color component has a 8-bit width and can have a value from 0 to 255, when the RGBW color wheel is used, it is possible to determine whether or not it is a pattern embeddable region specified in Formulas 2a to 2c using the following Formulas.

$0 \leq Rp+\Delta R \leq 255$ (Formula 5a)

$0 \leq Gp+\Delta G \leq 255$ (Formula 5b)

$0 \leq Bp+\Delta B \leq 255$ (Formula 5c)

$0 \leq Wp-\Delta W \leq 255$ (Formula 5d)

A region in which all of Formulas 5a to 5d are held is determined as the pattern embeddable region.

Figure 12:
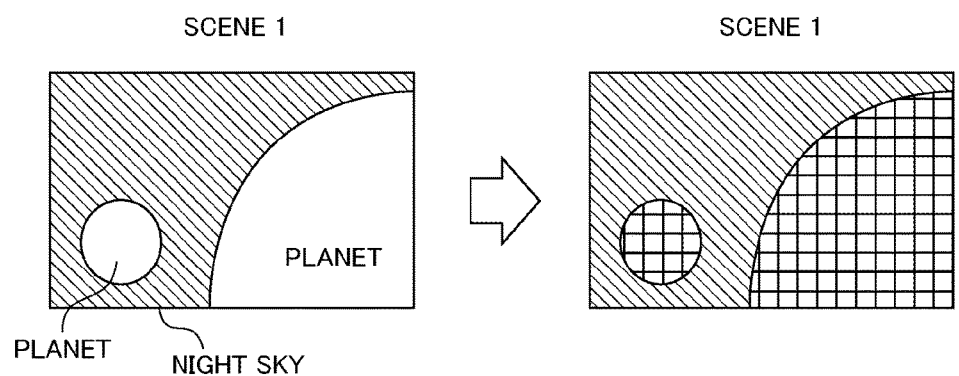
FIG. 12 is a grid pattern embedding example in a scene 1 in the third embodiment.

In a case in which the input video changes over time as in a moving picture, when a pattern is embedded at a different position for each scene as illustrated in FIG. 11 or FIG. 12 of a different scene on the basis of Formulas 5a to 5d, it is possible to embed the pattern in the entire screen as the entire video sequence. In a case in which a shape or a position of the projection object does not change over time or a change speed is negligibly slow, it is possible to sequentially embed the pattern in the entire projection region over time and perform 3D measurement or the like using this.

Fourth Embodiment

If the invisible marker can be embedded in the projection video as described above, it is also possible to performing correction in a case in which a superimposition region of a video deviates over time after installed and adjusted due to influence of vibration or a weight of the projector without giving influence to video content being projected. In the present embodiment, an example of implementing this will be described.

Figure 13:
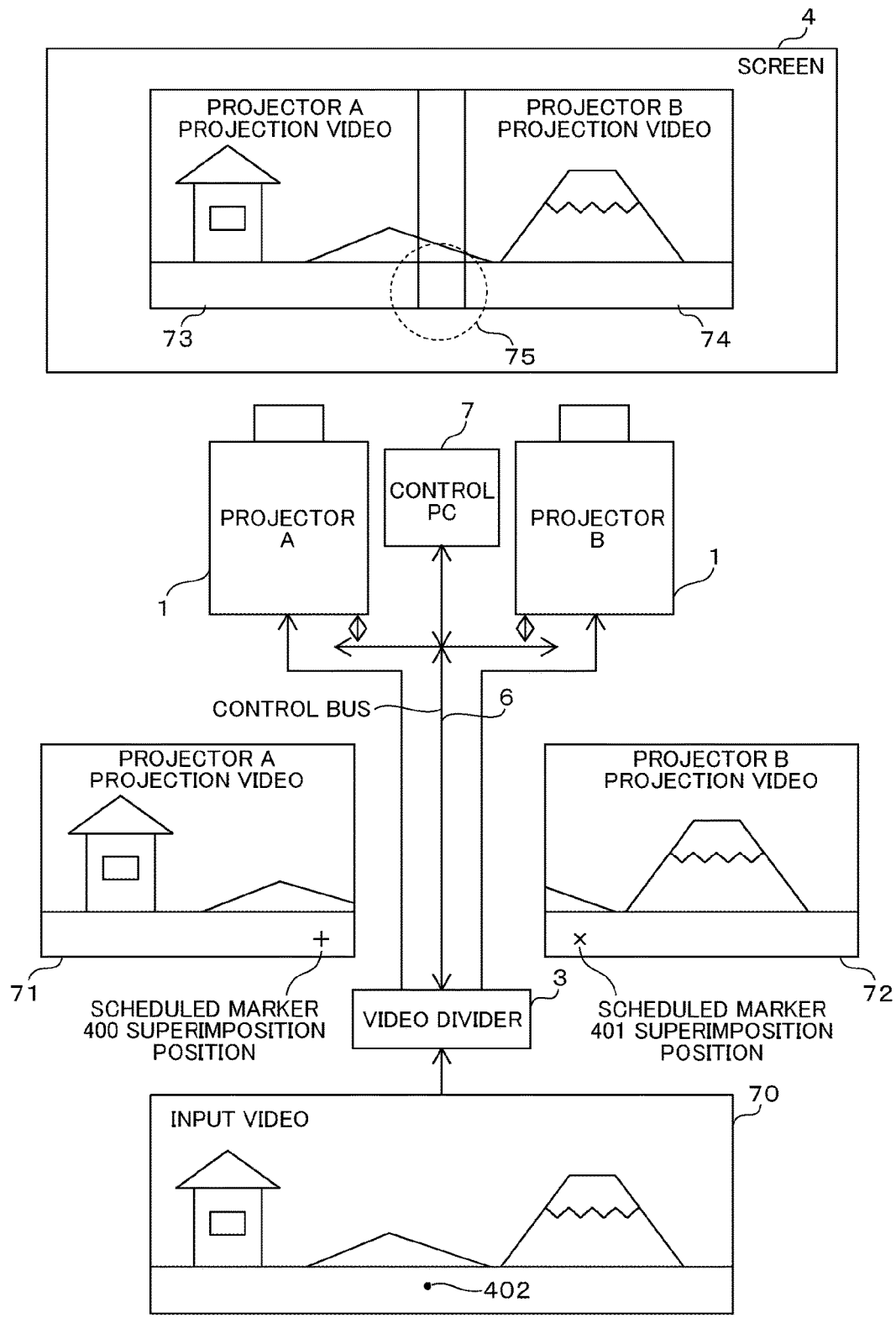
FIG. 13 is an example of multi-projector projection using a plurality of projectors in a fourth embodiment.

FIG. 13 illustrates an example of the multi-projector projection using two projectors in the present embodiment. In FIG. 13, a case in which a landscape-oriented video 70 is projected onto a landscape-oriented screen 4 using two projectors A and B. A video divider 3 clips two videos, that is, left and right videos 71 and 72 from an input video 70 and transmits the videos 71 and 72 to the projectors A and B. At this time, the video 71 and the video 72 are clipped so that a certain region overlaps to cause a connected portion to be less noticeable. Here, it is assumed that the projectors A and B have the same internal configuration as the projector 1 in FIG. 1 and are connected to the video divider 3 and a control PC 7 via a control bus 6.

The projectors A and B project the input videos 71 and 72 onto the screen 4 so that the input videos 71 and 72 overlap similarly to projection videos 73 and 74. At this time, a geometric transform circuit 24 in each projector corrects a trapezoidal distortion and adjusts a projection size and position.

In theory, a geometric transform parameter to be applied to the geometric transform circuit 24 is adjusted only once by projecting a test pattern in a case in which the projectors A and B and the projection object 2 are installed, but in practice, due to a temporal change of an installation angle caused by a weight of the projector, influence of vibration, or the like, the projection position of the projector gradually deviates as time elapses, and thus it is necessary to periodically adjust the geometric transform parameter.

In the present embodiment, by using the invisible pattern projection described in the first embodiment or the like, automatic adjustment of the geometric transform parameter is implemented without giving influence to normal video content reproduction.

In the geometric transform, if it is possible to acquire coordinates of four points in an input video and corresponding coordinates in a projection video after the geometric transform is applied, it is possible to solve a simultaneous equation and obtain the geometric transform parameter. A method of implementing this using the invisible marker will be described with reference to FIG. 14.

Figure 14:
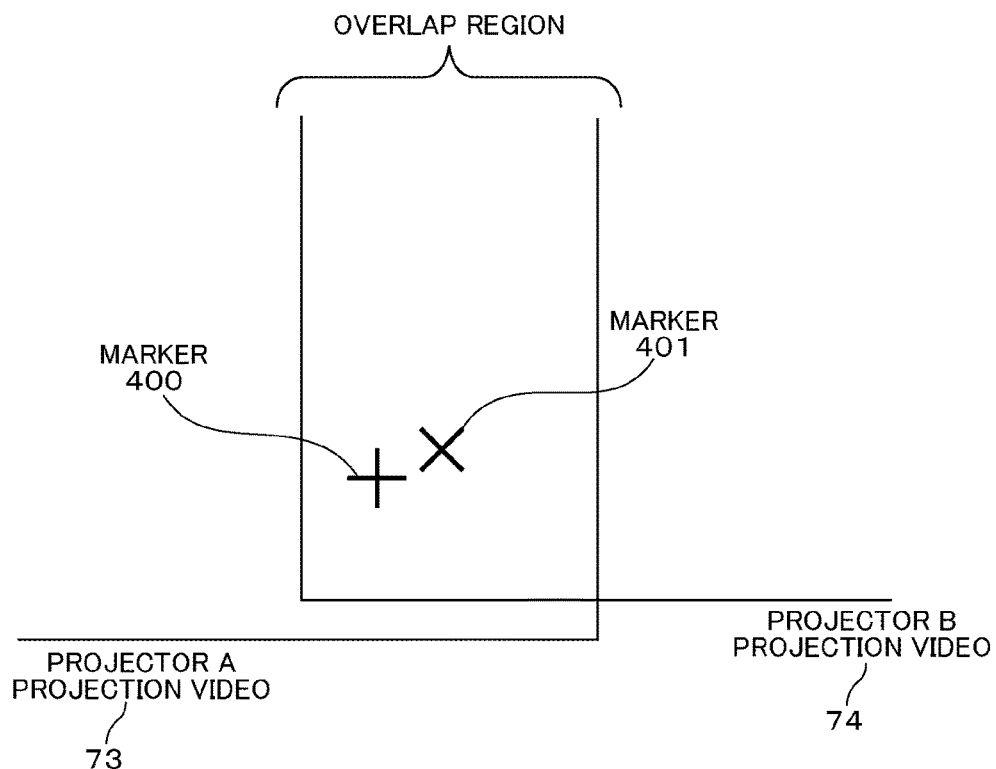
FIG. 14 is an enlarged view of a part of an overlap region of FIG. 13.

FIG. 14 is an enlarged view of a region around a lower region 75 of the overlap region of FIG. 13. In FIG. 14, a marker 400 is an invisible marker projected by the projector A, and a marker 401 is an invisible marker projected by the projector B. Both of these markers are embedded at the coordinates corresponding to a point 402 in the input video 70 and completely overlap if the projection video 73 and the projection video 74 are accurately superimposed. In other words, it is possible to cause the overlap region to be superimposed without any deviation by adjusting a perspective transformation parameter so that the marker 400 and the marker 401 coincide with each other.

In the present embodiment, the marker 400 and the marker 401 are photographed using the camera 30 mounted on the projector A. The camera need not be necessarily installed in the projector, and an external camera connected to the control PC 7 may be used. In this case, a photographing timing is transmitted from the projector A to the control PC 7 via the control bus 6, but an image in which the marker is identifiable may be selected from images which are consecutively photographed and used without causing the photographing timing to be controlled.

Here, if it is assumed that two video transmission timings to be output from the video divider 3 to the projectors A and B are perfectly synchronized with each other at a clock level, and the inside of each projector operates in synchronization with the input video, the phases of the color wheels of the projectors A and B almost coincide with each other.

As a result, in a case in which the marker 400 is photographed through the projector A, the marker 401 is also photographed at the same time. Here, if the shape of the marker 400 is set to "+," and the shape of the marker 401 is set to "x," it is possible to uniquely identify a projector which projects the two markers in a camera video. In this regard, it is possible to cause the projection positions of the marker 400 and the marker 401 to coincide with each other and cause the projection videos 73 and 74 to be superimposed without deviation such that a control microcomputer 42 installed in the projector A updates the geometric transform parameter so that the distance between the projection positions of the marker 400 and the marker 401 is reduced, and performs a feedback process.

Even in a case in which the phases of the color wheels of the projectors A and B are shifted, it is also possible to perform a similar process by detecting the positions of the respective markers from a plurality of images.

Fifth Embodiment

In present embodiment, an example of projecting a pattern obtained by encoding a URL or the like such as a two-dimensional bar code as the invisible pattern to be embedded in the projection video of the projector will be described.

Figure 15:
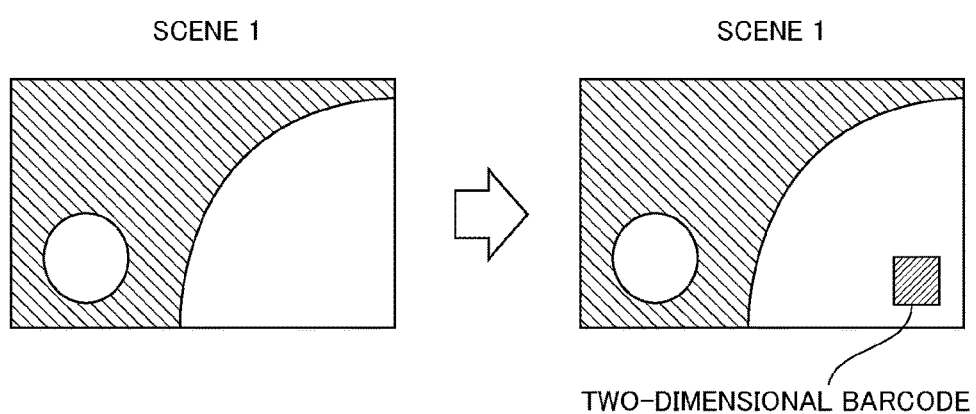
FIG. 15 is a diagram illustrating an example of embedding an encoded pattern in a fifth embodiment.

FIG. 15 is a diagram illustrating an example of embedding an encoded pattern in the present embodiment. In FIG. 15, in a scene in which there are an all-black portion and a non-all black portion as illustrated in the left drawing, it is possible to embed a two-dimensional bar code as an invisible pattern in the non-all black portion as illustrated in the right drawing.

Accordingly, for example, when an encoded pattern is embedded in a digital signage using a projector or the like in an invisible state, a use form in which a coupon is distributed to people who stand in front of the signage and photograph it with a camera such as a smartphone is possible. As the number of people who photograph the digital signage increases, it is expected that the number of people who post captured photographs to social media or the like is increased, and the exposure of advertisement is increased. Further, if a pattern is embedded only in a specific part of a specific scene of a digital signage video, the use of searching for a coupon with a game feel such as a treasure hunt is also considered.

In a case in which an unspecified number of people capture the projection video of the projector as described above, it is very difficult for the camera side to perform the photographing in synchronization with the color wheel. However, if the camera side consecutively captures a still image, it is possible to acquire a video in which an invisible pattern is identifiable at a rate of one per several videos and obtain an embedded code from a pattern in a captured video unless a photographing interval of the camera perfectly coincides with the rotation of the color wheel. In other words, a plurality of still images are captured at different timings at the time of photographing, a video in which an embedded pattern is likely to be identified is selected from a plurality of still images, and embedded pattern information is acquired.

Sixth Embodiment

Contrary to the fifth embodiment, even in a case in which a video obtained by capturing the project video of the projector with a camera such as a smartphone is not desired to be posted to social media and spread due to restrictions such as portrait rights of persons in video content such as a digital signage, copyrights, or the like, it is effective to embed the invisible pattern as a disturbance pattern using the method described above. In the present embodiment, this will be described.

Figure 16:
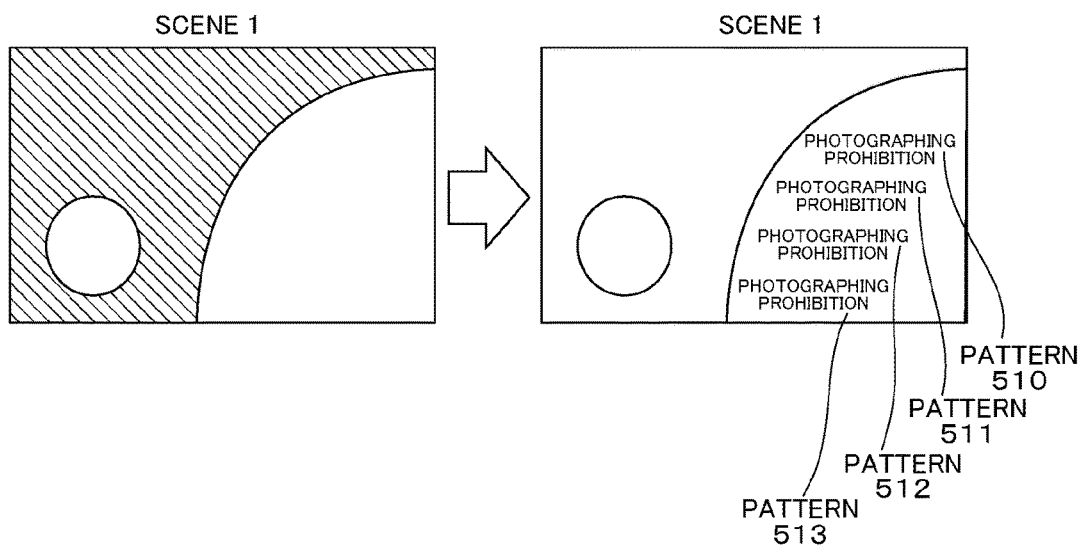
FIG. 16 is a diagram illustrating an example of embedding disturbance patterns with different timings in a sixth embodiment.

FIG. 16 is a diagram illustrating an example of embedding disturbance patterns of different timings in the present embodiment. In a scene in which there are an all-black portion and a non-all black portion as illustrated in the left drawing of FIG. 16, it is possible to embed disturbance patterns 510 to 513 as the invisible patterns at different positions of the non-all black portion as illustrated in the right drawing. In this example, characters are embedded, but a pattern such as a stripe may be embedded in the entire screen while changing its position.

Figure 17:
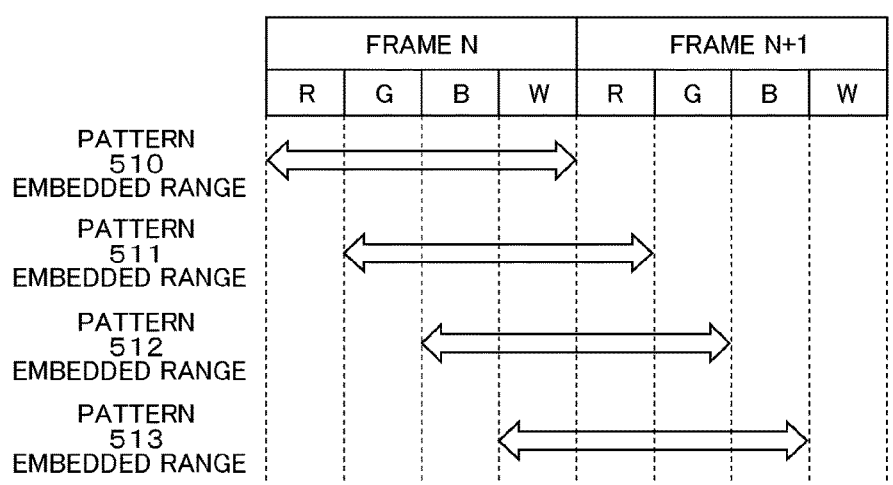
FIG. 17 is a diagram illustrating an example of disturbance pattern embedding timings with different timings in the sixth embodiment.

In this case, similarly to the fifth embodiment, a timing for photographing with a camera is unable to be restricted, but unlike the fifth embodiment in which it is possible to cope with it by photographing a plurality of videos and selecting an optimum video, in the present embodiment, in a case in which a plurality of videos are captured at different timings, the disturbance pattern is embedded in all the photographs. In the present embodiment, this is implemented by embedding a plurality of invisible patterns at different positions of the projection video of the projector at different timings. FIG. 17 illustrates an example of embedding the disturbance patterns in different sub frames. In FIG. 17, the disturbance patterns having the different embedding positions are embedded while sequentially shifting the embedding timings such that a disturbance pattern 510 is embedded using R, G, B, and W sub frames of a frame N, a disturbance pattern 511 is embedded using G, B, and W sub frames of the frame N and an R sub frame of a frame N+1. Accordingly, if the shutter speed is somewhat a high speed (less than several frames of the projector video), some of the disturbing patterns are included in the photograph regardless of a timing at which the photographing is performed.

If the shutter speed is sufficiently delayed, it is possible to prevent all the embedded patterns from being photographed, but in a case in which the display video is content with motion, a subject blurs in a photograph captured with a slow shutter speed, and a vivid photograph is not obtained, and thus a risk that it will be spread in social media is low.

The present invention is not limited to the above-mentioned embodiments and includes various modified examples. For example, the above-described embodiments have been described in detail in order to facilitate understanding of the present invention and are not necessarily limited to those having all the components described above. It is possible to add a configuration of another embodiment to a configuration of a certain embodiment. Further, it is possible to perform addition, deletion, and replacement of configurations of other embodiments on a part of the configurations of each embodiment.

Further, some or all of the configurations described above may be constituted by hardware or may be constituted to be implemented by executing a program through a processor.

REFERENCE SIGNS LIST 1 projector
2 projection object
3 video divider
4 screen
5 input video
6 control bus
7 control PC
10 light source
11 color wheel
12 optical modulation device
13 lens
14 projection video
20 projection video generation circuit
21 frame buffer
22 sub frame generation circuit
23 pattern synthesis circuit
24 geometric transform circuit
30 camera
31 pattern detection circuit
32 parameter calculation circuit
40 timing generation circuit
41 bus I/F circuit
42 control microcomputer
100 R sub frame
101 G sub frame
102 B sub frame
103 W sub frame
110 to 113 marker
120 to 123 grid
70 input video (whole)
71 divided video (left)
72 divided video (right)
73 projector A projection video
74 projector B projection video
400 invisible marker superimposed by projector A
401 invisible marker superimposed by projector B

The invention claimed is:

1. A projector that divides an input video into videos of a plurality of color components, projects the videos of the respective color components to the same position of a projection object in a time division manner, optically synthesizes the videos of the plurality of color components, and performs color display of the input video on a surface of the projection object, comprising:
a light source;
a color wheel that transmits only lights of wavelengths corresponding to the respective color components of light from the light source in the time division manner;
an optical modulation device that modulates the light of the light source passing through the color wheel on the basis of a supplied color component video;
a lens that projects the light modulated by the optical modulation device onto the projection object; and
a projection video generation circuit that divides the input video into the videos of the plurality of color components and supplying the videos of the plurality of color components to the optical modulation device at a timing synchronized with an operation of the color wheel,
wherein the color component includes at least one of three components of R, G, and B which are three primary colors and a color component other than R, G, and B, and
the projection video generation circuit causes a first superimposition video pattern to be superimposed on a video of the color component other than R, G, and B and causes a second superimposition video pattern to be superimposed on each of videos of the color components of R, G, and B, the second superimposition video pattern being generated to cancel the first superimposition video pattern on a surface of the projection object when averaged in a time direction.

2. The projector according to claim 1, further comprising:
a camera that captures a video projected on the projection object; and
a video analysis circuit that analyzes the video captured by the camera,
wherein the camera captures a video of a period in which the video of the color component other than R, G, and B is projected onto the projection object by performing photographing in synchronization with an operation of the color wheel, and the video analysis circuit obtains a projection position of the first superimposition video pattern from the captured video.

3. The projector according to claim 2, wherein the projection video generation circuit generates a second projection video obtained by performing geometric transform on the input video to be suitable for a shape and a direction of a projection surface of the projection object using a projection position of the first superimposition video pattern, and
the second projection video is projected onto the projection object via the optical modulation device and the lens.

4. The projector according to claim 1, wherein the color component other than R, G, and B is white or any one of cyan, magenta, and yellow.

5. A video display device that displays a color video by dividing an input color video into color component videos of four or more colors and displaying the color component videos of four or more colors in a time division manner, comprising:
a video generation circuit that cause superimposition video patterns which cancel one another when a display video is averaged in a time direction for one frame cycle period to be superimposed on the color component videos of the four or more colors.

6. The video display device according to claim 5, further comprising:
a camera that captures the displayed color video; and
a video analysis circuit that analyzes the video captured by the camera,
wherein the camera captures the color component videos on which the superimposition video pattern is superimposed by performing photographing in synchronization with the one frame cycle period, and the video analysis circuit obtains a superimposition position of the superimposition video pattern from the captured video.

7. The video display device according to claim 6, wherein the video generation circuit generates a display video obtained by performing geometric transform on the input color video using a superimposition position of the superimposition video pattern.

8. The video display device according to claim 5, wherein the color component videos of the four or more colors are R, G, B, and a color component video of at least white or any one of cyan, magenta, and yellow.

9. The video display device according to claim 6, wherein the input color video constitutes a series of video sequences whose content change over time,
the video generation circuit specifies a region suitable for superimposition of the superimposition video pattern in each video, and causes the superimposition video pattern to be superimposed on the region suitable for the superimposition,
the video analysis circuit performs a process of obtaining a superimposition position of the superimposition video pattern in a region on which the superimposition video pattern is superimposed, and
superimposition video patterns of all video display regions are obtained by sequentially performing the process on all the video sequences.

10. A camera used for capturing video on which the superimposition video pattern according to claim 5 is superimposed, wherein the camera performs capturing a plurality of still images at different timing at the time of photographing, selecting a video in which the superimposition video pattern is likely to be identified from the plurality of still images, and acquiring superimposition video pattern information.

11. The video display device according to claim 5, wherein a plurality of superimposition video patterns having different superimposition positions and different superimposition periods are embedded in a display video, and at least one or more of the plurality of superimposition video patterns are included in a captured video regardless of a timing at which the display video is captured.

12. A multi-projector projection system, comprising:
a plurality of video display devices according to claim 5,
wherein a position deviation of superimposition regions of the display videos of the video display devices is able to be corrected while displaying a video using the superimposition video pattern.

* * * * *